March 10, 1953  W. E. NAUGLER  2,630,692
FLEXIBLE COUPLING
Filed May 4, 1948

INVENTOR
Walter E. Naugler

Patented Mar. 10, 1953

2,630,692

UNITED STATES PATENT OFFICE 2,630,692

FLEXIBLE COUPLING

Walter E. Naugler, Beverly, Mass.

Application May 4, 1948, Serial No. 25,011

5 Claims. (Cl. 64—12)

This invention relates to flexible couplings for shafting and more particularly to shafting for motor driven vehicles and the like, wherein a varying angular relation must be provided for in the component parts of the shafting.

The object of the invention is to produce a flexible coupling of compact construction that is simple in the construction of its parts and convenient to assemble, requiring no lubrication in operation and capable of transmitting power uniformly and smoothly without strain and without impairing the balance of the system.

In one of its aspects the invention consists in an important improvement upon the construction disclosed in my earlier Patent Number 1,601,223, granted September 28, 1926.

A feature of the invention consists in the provision of a novel form of transmitting leaf and and in the combination of two such leaves in a single plane so as to facilitate free transverse flexing throughout the length of leaves and at certain favorable locations. The desired results are attained in transmitting leaves disposed in interlocking arrangement and each having a substantially U-shaped body with attaching ends disposed in angular relation.

Another feature of the invention consists in the provision of an intermediate member upon which may be balanced the bending forces developed in the transmitting leaves, so that the coupling as a whole will be self contained and there will be no tendency to run out of true in either part of the shafting.

Figures 1, 2:
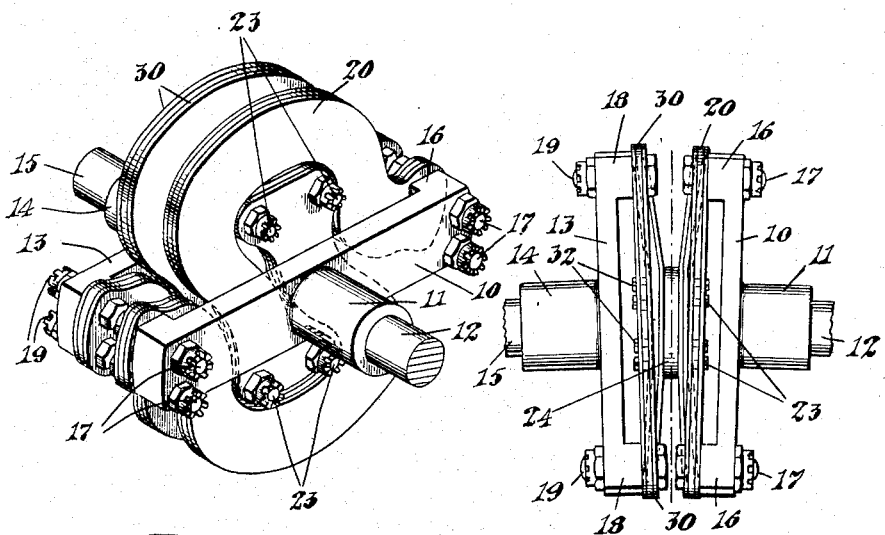
Figures 3, 4:
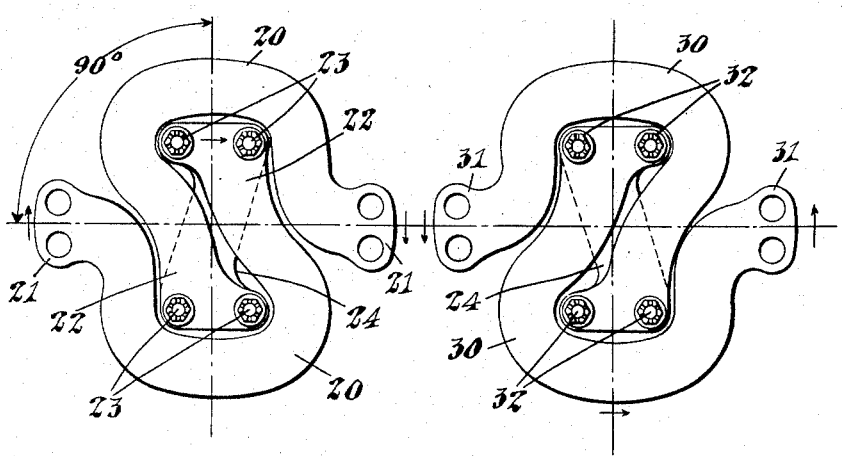

These and other features of the invention will be best understood and appreciated from the following description of a preferred embodiment thereof selected for purposes of illustration and shown in the accompanying drawings, in which Fig. 1 is a view in perspective of the complete coupling, Fig. 2 is a view in side elevation showing the driving and driven shafts at a slight angle to each other, Fig. 3 is a plan view from the driving side of the coupling with the driving spider omitted, and Fig. 4 is a similar view from the driven side with the driven spider omitted.

The coupling as a whole rotates about an axis coinciding with the mean axes of the driving and driven shafts, and consequently, the coupling will be described to some extent in the terms of polar dimensions.

The driving element of the coupling comprises a spider 10 having a hub 11 adapted to be keyed to the driving shaft 12; similarly the driven element comprises a spider 13 having a hub 14 adapted to be keyed to the driven shaft 15. The spider 10 has two oppositely disposed radial arms each provided with a spacing boss 16 to which the transmitting leaves are attached by bolts 17 arranged in pairs at the outer end of each arm of the spider. The bosses 16 space the transmitting leaves from the spider sufficiently to permit the maximum transverse flexing of the leaves which can ever occur in operation.

The transmitting leaves 20 are of thin sheet material and may be produced with good advantage by stamping or dieing out from sheet steel or phosphor bronze. Each leaf comprises a ribbon-like structure of compound curvature having an attaching end 21 disposed in a general radial relation to the axis of the coupling, a substantially U-shaped convoluted body portion and an attaching end 22 disposed also in substantially radial relation to the coupling and at right angles to the attaching end 21. While the attaching end 21 extends at right angles to the longitudinal axis of the U, the attaching end 22 is curved inwardly and lies substantially in that axis. One of these leaves is secured to the end of each arm of the driving spider 10 and the two leaves lie in the same plane and in interlocking arrangement with respect to the other, as shown in Fig. 3, that is to say, one leg of each leaf projects or extends with clearance into the loop of the other leaf.

Each leaf may be of a single thickness of material but as herein shown a laminated construction is preferred. Accordingly each leaf is made up of three plys, a laminate, the intermediate member, where the transverse bending distortion member is least, being somewhat heavier than the outer members. It will be apparent that each individual leaf, whether of single or multiple plies, is stiff against edgewise bending while at the same time being readily flexible widthwise.

The inner attaching end 22 of each leaf is secured by a pair of bolts 23 to an intermediate floating member 24 which comprises a bar disposed symmetrically at right angles to the driving spider 10 and perforated at both ends to receive the bolts 23. It will be noted that if the driving torque is transmitted by the spider 10 to the outer ends 21 of the transmitting leaves, it will be carried ahead by the leaves and transmitted to the intermediate member 24 at a point 90 degrees ahead of the spider in the direction of rotation, although the body part of each transmitting leaf is located almost entirely in the remaining 270 degrees of the coupling area, see Fig. 3.

It would be within the scope of my invention to drive directly from the point of connection with the intermediate member 24 but a superior coupling is secured by introducing another set of transmitting leaves between the intermediate member 24 and the driven spider 13. These as herein shown comprise the leaves 30 which are similar in shape to those already described and secured at their inner ends to the intermediate member 24 on the opposite side thereof from the leaves 20 and at their outer ends to the driven spider 13 and the spacing bosses 18 by the attaching bolts 19.

It will be observed that the intermediate member 24 is disposed at right angles to both the driving and driven spiders 10 and 13, and that, whereas the driving torque tends to wind up or close the transmitting leaves 20, being applied to their outer ends and opposed at their inner ends by the resistance of the intermediate member 24, the driving torque is transmitted through the transmitting leaves 30 in an opposite sense so that it tends to unwind or open the leaves 30. This results in a perfectly balanced distribution of force in the coupling for all driving torques and also a perfectly balanced distribution of the materials as a result of which the balance of the mechanism is preserved under all conditions.

It will be seen, moreover, that the shape of the transmitting members is such as to enable the ends thereof to spring easily and with a minimum amount of distortion into whatever position may be necessitated by the angular position of the driving and driven shafts. Their construction also compensates in the most advantageous manner possible for the slight endwise movement of the shafts occurring on account of their angular displacement.

Having thus described my invention, what I claim as new and desire to secure by Letters Patent of the United States is:

1. A flexible coupling comprising a driving head and a driven head rotatable about a common axis, and two normally flat transmitting leaves disposed in interlocking relation and both lying normally in a common plane disposed at right angles to said axis of rotation, each leaf being shaped for carrying a driving torque 90 degrees ahead in the direction of rotation and each lying in the remaining 270 degrees and being connected at one of their ends to the driving head and means fixedly connecting the other ends to each other and to the driven head.

2. A flexible coupling between driving and driven heads which are rotatable about a common axis, comprising three-ply flat U-shaped leaves disposed normally with their surfaces in a common plane at right angles to the axis of rotation of the heads with one leg of each leaf extending with clearance into the loop of the other leaf, means for connecting the outer end of each leaf to one of the heads, and means fixedly connecting the inner ends of the leaves to each other at diametrically opposite points with respect to said axis.

3. A flexible coupling between two heads which are rotatable about a common axis, comprising two pair of flat U-shaped leaves, each pair being disposed normally substantially in one of two common planes at right angles to the axis of rotation of the heads with one leg of each leaf projecting with clearance into the loop of another leaf, said leaves being stiff against edgewise bending and readily flexible in widthwise bending, a bar connecting the inner ends of each pair of leaves, and provision for connecting their outer ends to the respective heads.

4. A flexible coupling between two heads rotatable about axes which are substantially in line with each other, comprising a pair of flat laminated leaves generally U-shaped, each with one out-turned end and one straight end and disposed with the straight end of one leaf between the two legs of the other leaf, said pair of leaves lying in a common plane, an intermediate member connecting the straight ends of the leaves, and provision for connecting the out-turned ends to the respective heads.

5. In a flexible connection; a transmitting spider having projecting bosses, a flat U-shaped spring leaf fast at its outer end to each of said bosses and spaced by the boss from the spider, the leaves being stiff against edgewise bending and lying in a common plane with the inner leg of each leaf located within the loop of the other leaf, a floating member attached at one side and its opposite ends to the inner ends of the said leaves and disposed substantially at right angles to the said spider and a similar spider and transmitting leaves arranged as above described and attached to the opposite side of said intermediate member.

WALTER E. NAUGLER.

REFERENCES CITED

The following references are of record in the file of this patent:

UNITED STATES PATENTS

| Number | Name | Date |
|---|---|---|
| 137,899 | Dudley | Apr. 15, 1873 |
| 1,601,223 | Naugler | Sept. 28, 1926 |
| 1,654,312 | Trumpler | Dec. 27, 1927 |
| 2,146,547 | Lundgren | Feb. 7, 1939 |
| 2,178,151 | Wagar | Oct. 31, 1939 |
| 2,181,888 | Gustin | Dec. 5, 1939 |

FOREIGN PATENTS

| Number | Country | Date |
|---|---|---|
| 379,480 | Italy | Mar. 28, 1940 |